Dec. 13, 1932.　　M. C. STEARNS　　1,890,796
STORAGE APPARATUS
Filed Sept. 13, 1929　　2 Sheets-Sheet 1

Inventor.
Marcus C. Stearns.
By Dyrenforth, Lee, Chritton and Wiles
Attys.

Dec. 13, 1932.  M. C. STEARNS  1,890,796
STORAGE APPARATUS
Filed Sept. 13, 1929   2 Sheets-Sheet 2

Inventor.
Marcus C. Stearns
By Dyrenforth, Lee, Chritton and Wiles
Attys.

Patented Dec. 13, 1932

1,890,796

UNITED STATES PATENT OFFICE

MARCUS C. STEARNS, OF CHICAGO, ILLINOIS

STORAGE APPARATUS

Application filed September 13, 1929. Serial No. 392,298.

This invention relates to improvements in storage apparatus, and more especially such apparatus for the storage of vehicles, for example motor vehicles.

By the use of my invention, storage space may be conserved. I am able to store practically twice as many cars in a given area by the use of my invention.

The apparatus required in the practice of my invention is exceedingly simple in construction and operation, thus adapting the same for use in practically any location.

My invention is especially valuable for use in larger cities, and metropolitan districts where storage space for motor vehicles is at a premium, and where the placing of vehicles in storage and their removal therefrom with ease and facility is especially desirable.

Other features and advantages of my invention will appear more fully as I proceed with my specification.

Figures 2, 3:
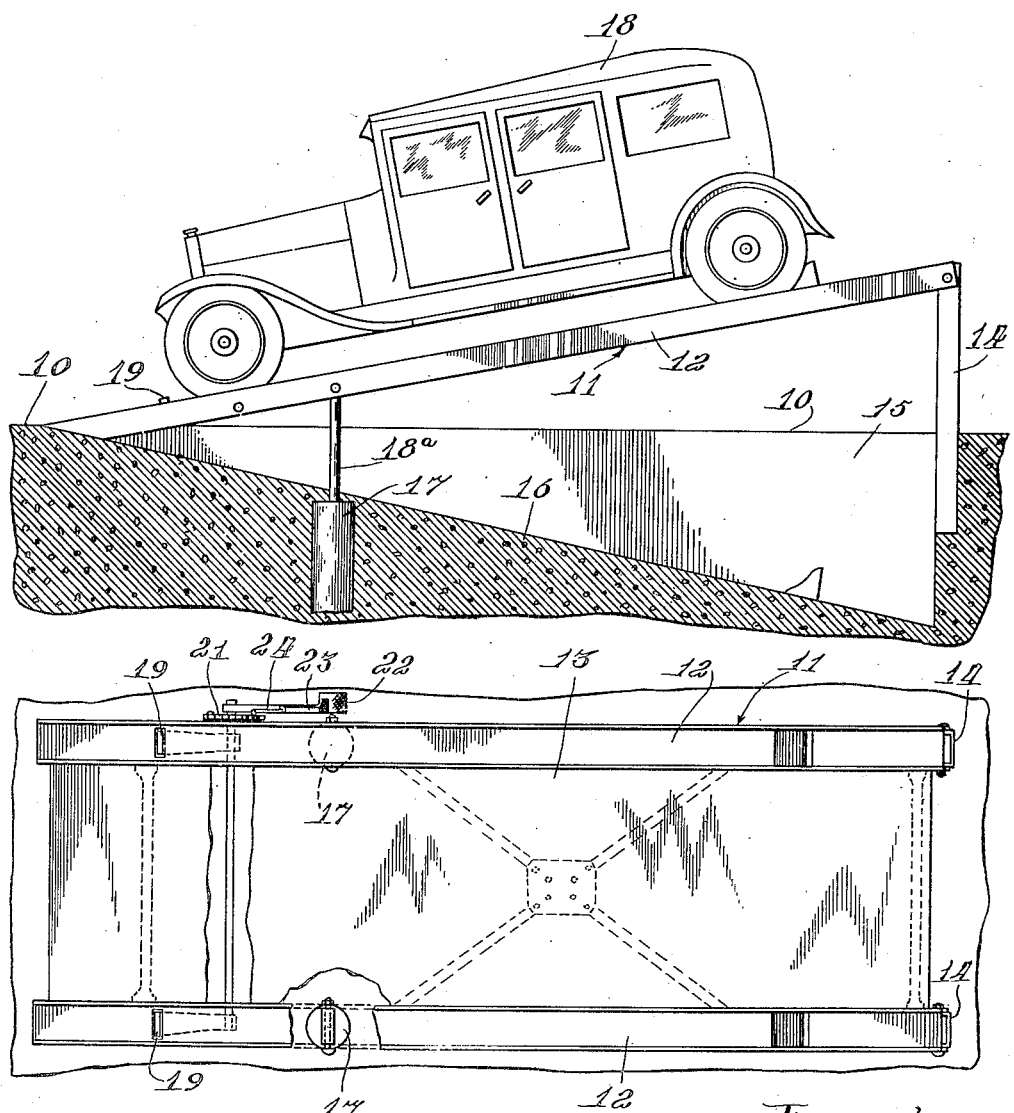
Figure 3:
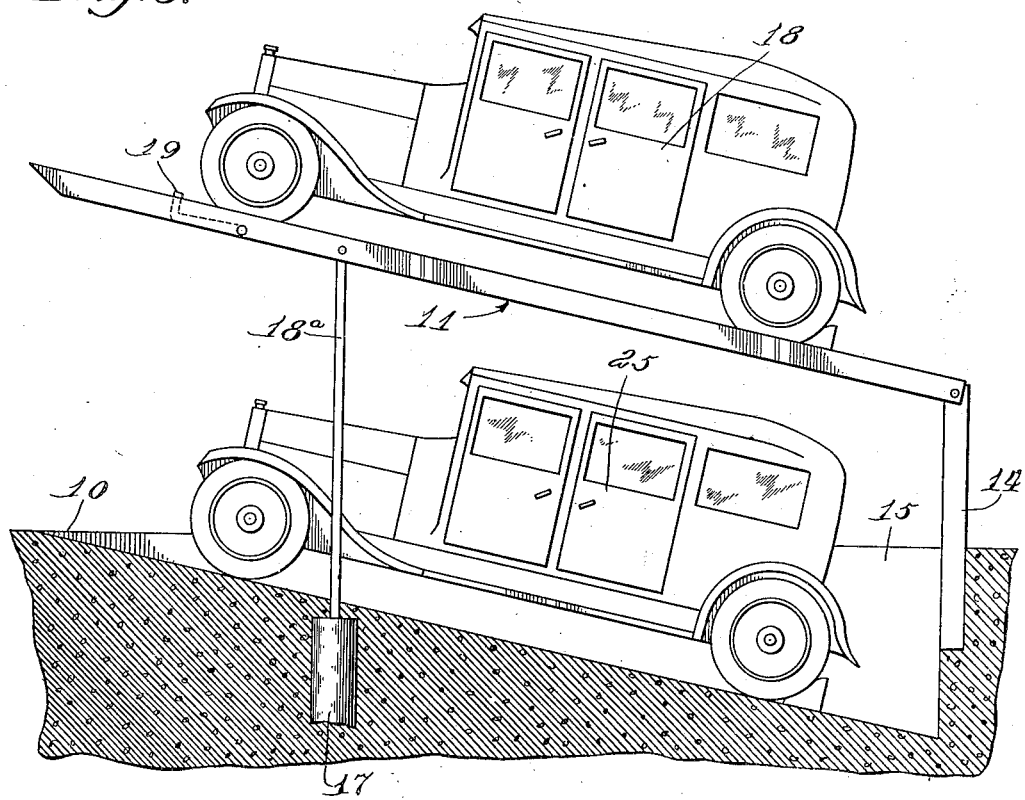
Figure 4:
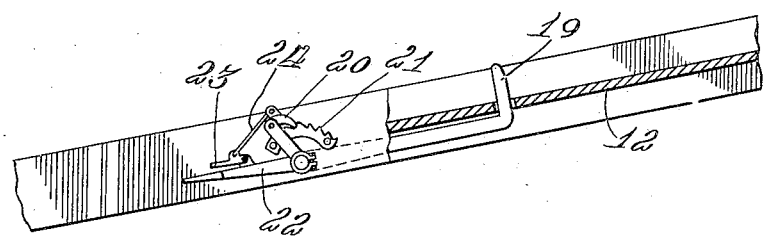

In that form of device embodying the features of my invention, shown in the accompanying drawings, Figure 1 is a view in side elevation; Fig. 2 is a top plan view; Fig. 3 is a view similar to Fig. 1, showing two cars in storage; and Fig. 4 is a detailed view of one of the car stops.

In disclosing the invention, I shall show merely a single unit of storage space adapted to house two cars. This will suffice to illustrate the invention. It is to be understood, of course, that there may be as many of such units as desired.

As shown in the drawings, 10 indicates a supporting surface which, for example, may be the ground, the floor of a building, or the like. As here shown, it indicates specifically the ground; as my invention is especially adapted to be used in connection with storage where little or no building or structure is employed, use being made of the normal ground surface.

11 indicates, in general, an inclined supporting platform, here shown as formed of two parallel channel irons 12, 12, connected by a flat sheet metal member 13. The lower ends of the channel 12 which form tracks for the wheels of the vehicles are flush with the ground 10 and the upper ends are pivotally journaled on suitable posts 14, at an elevation here shown as substantially one-half the average height of a motor vehicle. For example, if the average motor vehicle is six or seven feet high, the upper ends of the channels 12 may be elevated about three or four feet.

Under the platform 11 is formed a depression 15 with a slanting bottom 16, the upper end of which is adjacent the ground level 10. The deeper end of the depression 15 has a depth substantially equal to one-half the average height of a motor vehicle.

The lower ends of the channels 12 are adapted to be raised by any suitable means. For this purpose, I have here shown a hydraulic cylinder 17 with the usual elevating piston 18ª. The platform 11 is shown in the lowered position in Fig. 1, and in raised position in Fig. 3. It will be seen that the free end of the platform 11 is adapted to be raised high enough to permit the storage of a vehicle underneath the same in the pit or depression 15.

Suitable stop means are provided for holding a vehicle 18 on the slanting platform 11 when it is in lowermost position. Such means may include a car-stop 19, projecting through holes in the channels 12 and adapted to be held in position by a suitable pawl 20 operating over teeth 21 on a suitable curved segment. A release lever 22 is provided for operating the car stop 19, and a short lever 23 is connected by a link 24 to the pawl 20 to release the same from the ratchet teeth to permit lowering of the car stop.

In the operation of the device, a car 18 is run up on the platform 11, as shown in Fig. 1, and the car-stop 19 raised to hold it. The free end of the platform is then elevated by means of the hydraulic cylinder and a second car, 25, may be stored under the platform 11 in the pit or depression 15.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. Storage apparatus for vehicles including; a supporting surface with a depression therein having a slanting bottom, the upper end of said bottom being substantially level with said surface; an inclined platform above said depression with its lower end substantially level with said surface and its upper end pivotally supported above the deeper end of said depression, said platform adapted to hold a vehicle stored thereon; and means for raising the lower end of said platform to permit the storage of a second vehicle in said depression and under said platform.

2. Storage apparatus as claimed in claim 1 in which the depth of the deeper end of the depression and the elevation of the pivoted end of the platform is each substantially equal to one-half of the average height of a motor vehicle to be stored.

3. Storage apparatus for vehicles including; a supporting surface with a depression therein having a slanting bottom, the upper end of said bottom being substantially level with said surface; an inclined platform above said depression with its lower end substantially level with said surface and its upper end above the deeper end of said depression, said platform adapted to hold a vehicle stored thereon; and means for raising the lower end of said platform to permit the storage of a second vehicle in said depression and under said platform.

4. A storage apparatus for vehicles including; a movable, vehicle receiving platform, means to support one end of said platform sufficiently above a supporting surface to receive an end of a vehicle therebeneath with the remaining end of the platform at the level of the supporting surface, and means to raise the last named end of the platform to height to admit a vehicle on the supporting surface entirely beneath the platform.

5. A storage apparatus for vehicles including; a normally downwardly inclined vehicle receiving platform, a fixed pivot for the upper end of said platform elevated above a supporting surface sufficiently to receive one end of a second vehicle therebeneath, and means to move said platform with a vehicle carried thereby about said axis to a position to admit said second vehicle entirely below the platform in substantial registry with the elevated vehicle.

In testimony whereof, I hereunto set my hand and affix my seal, this 7th day of September, 1929.

MARCUS C. STEARNS.